United States Patent
Jeong

(10) Patent No.: US 10,005,446 B2
(45) Date of Patent: Jun. 26, 2018

(54) METHOD AND DEVICE FOR CONTROLLING A BATTERY STATE OF CHARGE FOR CRUISE TRAVEL OF A HYBRID VEHICLE

(71) Applicant: HYUNDAI MOTOR COMPANY, Seoul (KR)

(72) Inventor: Seok Min Jeong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/444,888

(22) Filed: Feb. 28, 2017

(65) Prior Publication Data

US 2018/0111598 A1    Apr. 26, 2018

(30) Foreign Application Priority Data

Oct. 21, 2016    (KR) .................. 10-2016-0137784

(51) Int. Cl.
| | |
|---|---|
| *B60W 20/00* | (2016.01) |
| *B60W 20/11* | (2016.01) |
| *B60W 20/13* | (2016.01) |
| *B60L 11/18* | (2006.01) |

(52) U.S. Cl.
CPC .......... *B60W 20/11* (2016.01); *B60L 11/1862* (2013.01); *B60W 20/13* (2016.01); *B60W 2510/244* (2013.01); *B60W 2900/00* (2013.01); *Y10S 903/93* (2013.01)

(58) Field of Classification Search
CPC ................. B60W 20/11; B60W 20/13; B60W 2510/244; B60W 2900/00; B60L 11/1862; B60L 11/1861; B60L 11/1864; B60L 11/1866; Y10S 903/93

USPC ..................................................... 701/22, 93
See application file for complete search history.

(56) References Cited

U.S. PATENT DOCUMENTS

| | | | | |
|---|---|---|---|---|
| 2013/0325744 | A1* | 12/2013 | Sinai ................ | G06Q 10/105 |
| | | | | 705/345 |
| 2016/0244044 | A1* | 8/2016 | Miller ................ | B60W 10/06 |

FOREIGN PATENT DOCUMENTS

| | | |
|---|---|---|
| JP | 2007-062589 A | 3/2007 |
| JP | 2010064522 A | 3/2010 |
| JP | 5644360 B2 | 12/2014 |
| JP | 2015140033 A | 8/2015 |
| KR | 10-2012-0060631 A | 6/2012 |
| KR | 101382306 | 5/2014 |
| KR | 10-1510048 B1 | 4/2015 |

* cited by examiner

*Primary Examiner* — Marthe Y Marc-Coleman
(74) *Attorney, Agent, or Firm* — Lempia Summerfield Katz LLC

(57) ABSTRACT

A method for controlling a state of charge (SOC) of a battery for a cruise travel of a hybrid vehicle includes predicting, by a controller, the SOC of the battery including a change slope of the SOC of the battery for the cruise travel based on a measured value of the SOC. The method includes determining, by the controller, whether the predicted SOC of the battery is equal to or greater than a maximum value of a normal range of the battery when the change slope of the SOC is greater than zero. The method includes driving, by the controller, only a driving motor of the hybrid vehicle whereby the driving motor uses electric power of the battery when the predicted SOC of the battery reaches the maximum value of the normal range of the battery. The normal range of the battery is a region required for the cruise travel of the hybrid vehicle.

6 Claims, 3 Drawing Sheets

METHOD AND DEVICE FOR CONTROLLING A BATTERY STATE OF CHARGE FOR CRUISE TRAVEL OF A HYBRID VEHICLE

CROSS-REFERENCE TO RELATED APPLICATION

This application claims priority to and the benefit of Korean Patent Application No. 10-2016-0137784 filed in the Korean Intellectual Property Office on Oct. 21, 2016, the entire contents of which are incorporated herein by reference.

BACKGROUND

Field of the Disclosure

The present disclosure relates to a hybrid vehicle (or a hybrid electric vehicle), and more particularly, to a method and a device for controlling a state of charge of a battery for cruise travel of a hybrid vehicle.

Description of the Related Art

Environmentally-friendly vehicles include a fuel cell vehicle, an electric vehicle, a plug-in electric vehicle, and a hybrid vehicle, and also typically include a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor. The hybrid vehicle can also be driven in a driving mode, such as a hybrid electric vehicle (HEV) mode, which uses rotational force of the engine as main power and uses rotational force of the motor as auxiliary power. The hybrid vehicle can also be driven in a driving mode, such as a regenerative braking (RB) mode for collecting braking and inertial energy during driving by braking or inertia of the vehicle through electricity generation of the motor to charge the battery.

The hybrid vehicle may be equipped with an auto cruise control system that maintains a driving speed of the vehicle at a predetermined target vehicle speed without the help of a driver. No help from the driver means that the driver does not manipulate a mechanism, such as an accelerator pedal and a brake pedal, related to or to control a vehicle speed. For an auto cruise control system, the electric vehicle driven using a motor controls the motor torque based on a speed control torque. For an auto cruise control system, the hybrid vehicle driven using a motor and an engine distributes power to the motor and the engine so as to generate a speed control torque.

The above information disclosed in this Background section is only to enhance the understanding of the background of the disclosure and therefore it may contain information that does not form the prior art that is already known in this country to a person of ordinary skill in the art.

SUMMARY

The disclosed embodiments have been made in an effort to provide a method and a device for controlling a state of charge (SOC) of a battery for cruise travel of a hybrid vehicle. The disclosed embodiments of the method and the device are capable of preventing unnecessary energy consumption and of optimizing driving energy during cruise travel in the hybrid vehicle driven by an engine and a motor. As used herein, cruise travel means that the vehicle speed is being controlled or maintained by an automatic or electronic cruise control system.

An embodiment of the present disclosure may provide a method for controlling the SOC of the battery for cruise travel of the hybrid vehicle. The method may include predicting, by a controller, the SOC of the battery including a change slope of the SOC of the battery for the cruise travel based on a measured value of the SOC. The method may include determining, by the controller, whether the predicted SOC of the battery is equal to or greater than a maximum value of a normal range of the battery when the change slope of the SOC is greater than zero. The method may include driving, by the controller, only a driving motor of the hybrid vehicle that uses electric power of the battery when the predicted SOC of the battery reaches the maximum value of the normal range of the battery. The normal range of the battery may be a region required for the cruise travel of the hybrid vehicle.

The controller may predict the change slope of the SOC using a regression analysis method.

The controller may calculate the change slope of the SOC based on the measured value according to the cruise travel and a predicted value of the SOC of the battery according to the cruise travel.

The method for controlling the SOC of the battery for cruise travel of the hybrid vehicle may further include determining, by the controller, whether the change slope of the SOC is less than zero when the change slope of the SOC is not greater than zero. The method may further include determining, by the controller, whether the predicted SOC of the battery is equal to or less than a minimum value of the normal range of the battery when the change slope of the SOC is less than zero. The method may further include driving, by the controller, only the engine of the hybrid vehicle that charges the battery when the predicted SOC of the battery reaches the minimum value of the normal range of the battery.

The method for controlling the SOC of the battery may further include maintaining, by the controller, a driving state of the hybrid vehicle in a previous cruise travel state in which the driving motor and the engine are operated when the change slope of the SOC is zero.

An embodiment of the present disclosure may provide a device for controlling the SOC of the battery for cruise travel of the hybrid vehicle. The device may include a battery configured to store a high voltage and a controller configured to predict the SOC of the battery including a change slope of the SOC of the battery for the cruise travel based on a measured value of the SOC. The controller may determine whether the predicted SOC of the battery is equal to or greater than a maximum value of a normal range of the battery when the change slope of the SOC is greater than zero. The controller may drive only a driving motor of the hybrid vehicle that uses electric power of the battery when the predicted SOC of the battery reaches the maximum value of the normal range of the battery. The normal range of the battery may be a region required for the cruise travel of the hybrid vehicle.

The controller may predict the change slope of the SOC using a regression analysis method.

The controller may calculate the change slope of the SOC based on the measured value according to the cruise travel and a predicted value of the SOC of the battery according to the cruise travel.

The controller may determine whether the change slope of the SOC is less than zero when the change slope of the SOC is not greater than zero. The controller may determine whether the predicted SOC of the battery is equal to or less than a minimum value of the normal range of the battery when the change slope of the SOC is less than zero. The controller may drive only the engine of the hybrid vehicle that charges the battery when the predicted SOC of the battery reaches the minimum value of the normal range of the battery.

The controller may maintain a driving state of the hybrid vehicle in a previous cruise travel state in which the driving motor and the engine are operated when the change slope of the SOC is zero.

The method and the device for controlling the state of charge of the battery for cruise travel of the hybrid vehicle according to the embodiments of the present disclosure may appropriately use the engine and the motor and may enable a regenerative braking and a cruise travel.

An embodiment of the present disclosure may adjust (or control) a SOC of a high voltage battery to be maintained in a certain region where the motor torque control is performed so that the hybrid vehicle may normally perform the cruise travel.

Further, an embodiment of the present disclosure may perform the regenerative braking using the motor and may enable control of an optimum operating point of the engine so that the embodiment of the present disclosure increases energy efficiency.

BRIEF DESCRIPTION OF THE DRAWINGS

A brief description of the drawings is provided to more sufficiently understand the drawings, which are referenced in the detailed description of the present disclosure.

DETAILED DESCRIPTION OF THE EMBODIMENTS

Figure 1:
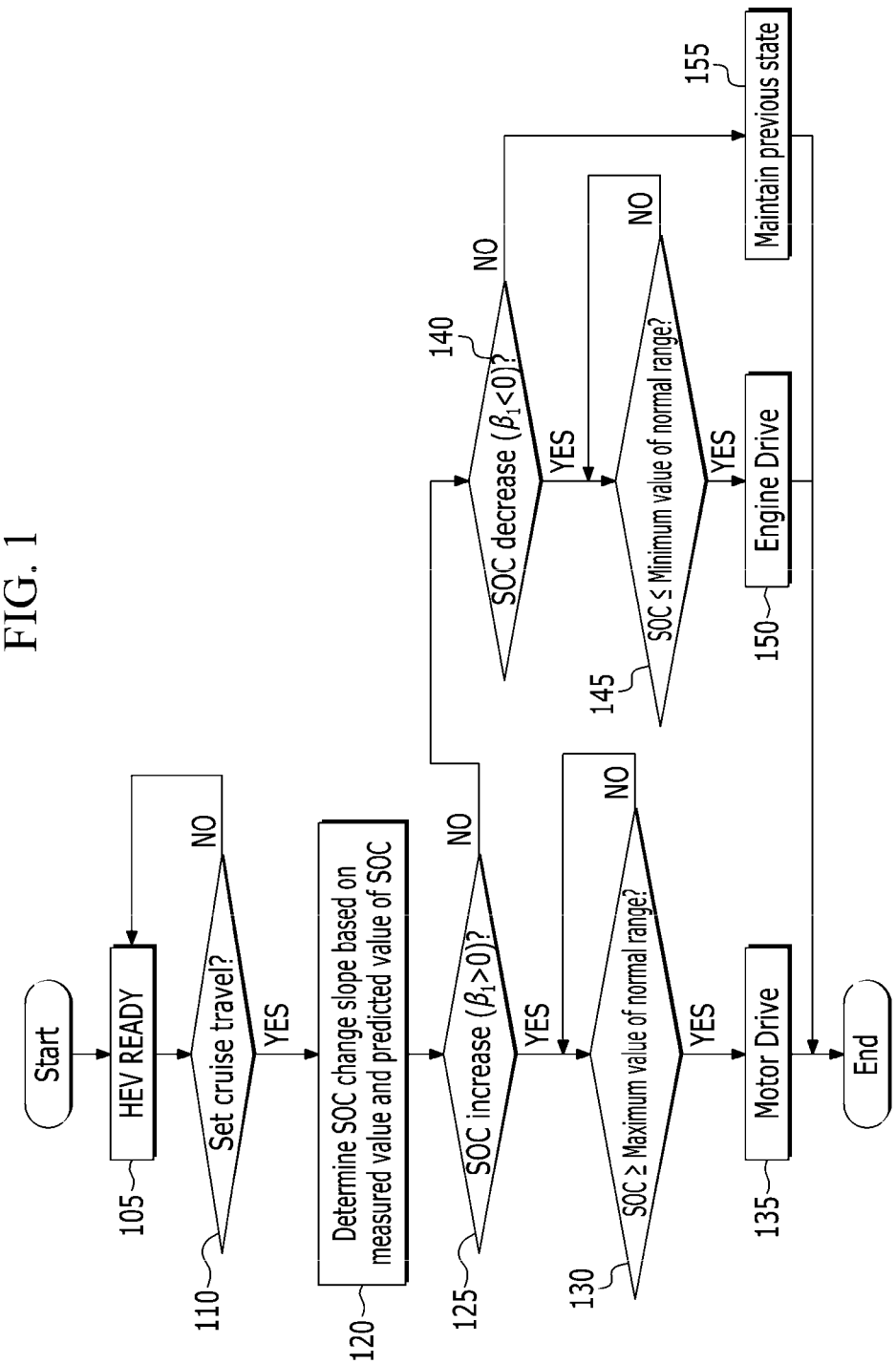
FIG. 1 is a flowchart illustrating a method for controlling a state of charge (SOC) of a battery for cruise travel of a hybrid vehicle according to an embodiment of the present disclosure.

In order to sufficiently understand the present disclosure and the object achieved by embodying the present disclosure, the accompanying drawings illustrating embodiments of the present disclosure and contents described in the accompanying drawings are to be referenced.

Hereinafter, the present disclosure will be described in detail by describing embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific embodiments rather than to limit the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It is also to be understood that the terms defined by the dictionary are identical with the meanings within the context of the related art, and they should not be ideally or excessively formally defined unless the context clearly dictates otherwise.

A cruise control or auto cruise control system of a vehicle can use a control that distributes torque of an engine and torque of a motor (or a drive motor) according to a state of a high voltage battery. When the high voltage battery reaches or achieves a fully charged state, only discharge of the motor torque is performed so that the motor can drive the vehicle using a discharge power of the high voltage battery. Therefore, regenerative braking or speed control of the motor is not possible so that a control to lower a gear shift stage of a transmission can be performed in order to maintain the cruise control of the vehicle. However, in consideration of the performance of the transmission and operability of the vehicle, it may be difficult to use the control that lowers the gear shift stage of the transmission for the cruise control.

In other words, a downshift using the transmission may be performed to follow a target speed of the cruise control when the high voltage battery is in the fully charged state (or a maximum charge state). However, since the method of maintaining a speed of a cruise mode using the downshift of the transmission is a temporary method, cruise speed control may become difficult or impossible.

In more detail, a hybrid electric vehicle (HEV) or a plug-in hybrid electric vehicle (PHEV) uses a hybrid starter-generator (HSG) to consistently charge the high voltage battery with spare energy generated by the engine during a cruise travel. Thus, regenerative braking cannot be performed because the high voltage battery reaches or achieves the fully charged state after a certain time elapses. As a result, the cruise control can be released due to a speed error of the motor (or the vehicle) or can give a driver a disharmony (or a sense of heterogeneity) due to a speed change.

Figure 2:
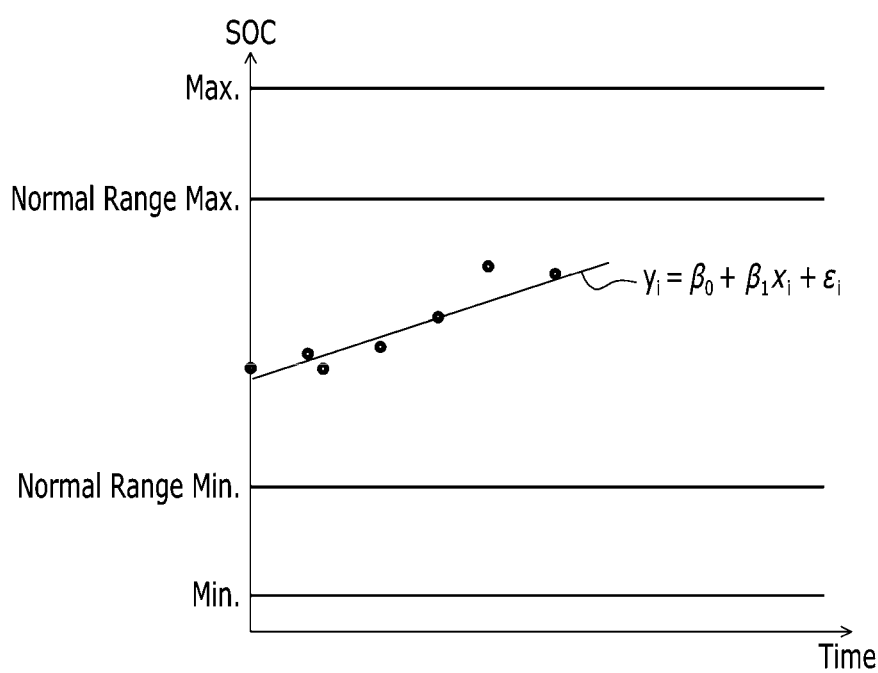
FIG. 2 is a graph describing a method for controlling the state of charge (SOC) of the battery for cruise travel of the hybrid vehicle according to an embodiment of the present disclosure.
Figure 3:
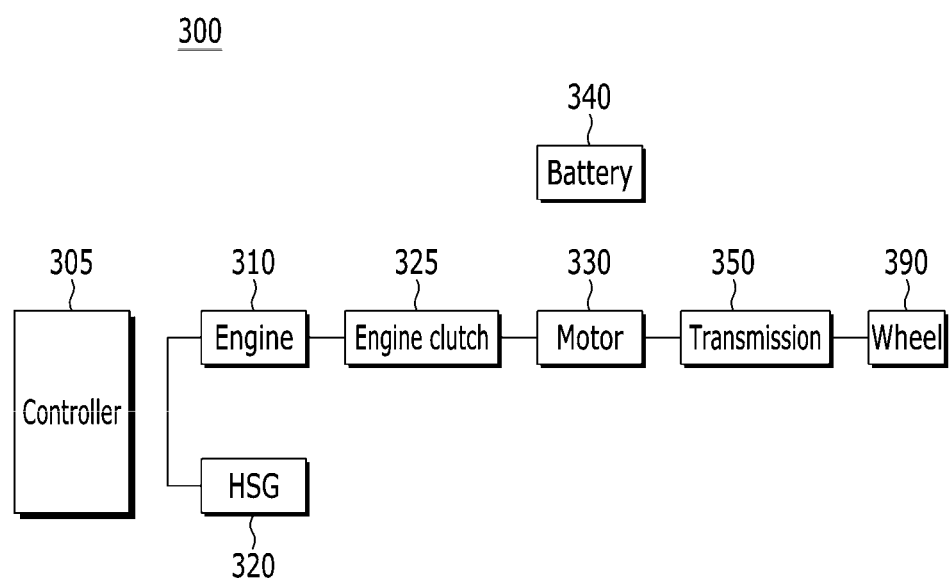
FIG. 3 is a block diagram illustrating a hybrid vehicle to which the method for controlling the state of charge (SOC) of the battery for cruise travel is applied according to an embodiment of the present disclosure.

FIG. 1 is a flowchart illustrating a method for controlling a state of charge (SOC) of a battery for cruise travel of a hybrid vehicle according to an embodiment of the present disclosure. FIG. 2 is a graph describing a method for controlling the state of charge (SOC) of the battery for cruise travel of the hybrid vehicle according to an embodiment of the present disclosure. FIG. 3 is a block diagram illustrating a hybrid vehicle to which the method for controlling the state of charge (SOC) of the battery for cruise travel is applied according to an embodiment of the present disclosure.

Referring to FIGS. 1, 2, and 3, in a waiting step 105, a controller 305 may control the hybrid vehicle 300, which is a system including an engine 310 and a driving motor 330, to enter a standby state for cruise travel (or cruise driving).

A control system, which is a cruise control device or an automatic speed control device, for performing cruise control in the hybrid vehicle 300, such as a hybrid electric vehicle (HEV) or a plug-in hybrid electric vehicle (PHEV), may control speed of the vehicle at a target speed set by a driver of the vehicle when the target speed is set by simple operation of a switch (e.g., a speed setting button) operated by the driver. Thus, the cruise control device may greatly reduce an operation of an accelerator pedal operated by the driver to improve driving convenience. The cruise control device may repeatedly detect a difference (or an error) between the target speed of the vehicle and a current speed of the vehicle while the vehicle is traveling, and may perform feedback control to correct the error.

The hybrid vehicle 300 includes the controller 305, the engine 310, a hybrid starter-generator (HSG) 320, an engine clutch 325, the motor (or the driving motor) 330, which may be an electric motor, a battery 340, a transmission 350, and wheels (or driving wheels) 390. The device for controlling the SOC of the battery for cruise travel of the hybrid vehicle may include the controller 305 and the battery 340.

The hybrid vehicle 300, which is a hybrid electric vehicle, may use the engine 310 and the motor 330 as power sources. The hybrid vehicle 300 includes the engine clutch 325 existing between the engine 310 and the motor 330. The hybrid vehicle 300 may be operated in the electric vehicle (EV) mode in which the hybrid vehicle 300 travels by the motor 330 in a state where the engine clutch 325 is opened. The hybrid vehicle 300 may also be operated in a hybrid electric vehicle (HEV) mode in which the hybrid vehicle 300 is capable of travelling by both the motor 330 and the engine 310 in a state where the engine clutch 325 is closed.

The hybrid vehicle 300 may include a powertrain of a transmission mounted electric device (TMED) type in which the motor 330 is connected to the transmission 350. The hybrid vehicle 300 may provide a driving mode, such as the EV mode, which is the electric vehicle mode using only power of the motor, and the HEV mode, which uses rotational force of the engine as main power and uses rotational force of the motor as auxiliary power, depending on whether the engine clutch 325 that is disposed between the engine 310 and the motor 330 is engaged (or connected). In more detail, the hybrid vehicle 300 includes a structure in which the motor 330 may be directly connected to the transmission 350. Revolutions per minute (RPM) of the engine may be increased by drive of the HSG 320. Power delivery and power cutoff between the engine and the motor may be performed via engagement and release of the clutch 325. A driving force may be transmitted (or transferred) to the wheels 390 through a power transmission system which may include the transmission 350. Also, torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU).

The HCU may control starting of the engine by controlling the HSG 320 when the engine 310 stops. The HCU may be the highest controller, and may synthetically control controllers (for example, the MCU) connected to a network such as a controller area network (CAN) which is a vehicle network, and may control overall operation of the hybrid vehicle 300. A driving information detector (not shown) of the hybrid vehicle 300 may provide a position value (or displacement) of an accelerator pedal, a position value (or displacement) of a brake pedal, and information about selection of an automatic cruise travel to the HCU.

The MCU may control the HSG 320 and the motor 330. The MCU may control an output torque of the driving motor 330 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter may convert a direct current (DC) voltage that is supplied from the battery 340 into a three-phase alternating current (AC) voltage to drive the driving motor 330. The MCU may be disposed between the battery 340 and the motor 330.

The ECU may control a torque of the engine 310. The ECU may control an operating point (or a driving point) of the engine 110 through the network depending on a control signal output from the HCU. The ECU may control the engine 310 to output an optimal torque. The TCU may control an operation of the transmission 350.

For example, the controller 305 may be one or more microprocessors operated by a program or hardware including the one or more microprocessors. The program may include a series of commands for executing the method for controlling the SOC of the battery for cruise travel of the hybrid vehicle according to an embodiment of the present disclosure.

The engine 310 may include a diesel engine, a gasoline engine, a liquefied natural gas (LNG) engine, or a liquefied petroleum gas (LPG) engine. The engine 310 may output a torque at the operating point depending on a control signal output from the ECU. The torque may be combined with driving force of the driving motor 330 in the HEV mode.

The engine 310 may be connected to the motor 330 via the engine clutch 325 to generate a power transmitted to the transmission 350.

The HSG 320 may operate as a motor depending on a control signal output from the MCU to start the engine 310. The HSG 320 may operate as a generator in a state in which start of the engine 310 is maintained to provide generated electric power to the battery 340 via the inverter. The HSG 320 may be connected to the engine 310 through a belt. The HSG 320, which is a motor that cranks the engine, may be directly connected to the engine.

The engine clutch 325 may be disposed (or mounted) between the engine 310 and the driving motor 330. The engine clutch 325 may be operated to switch power delivery between the engine 310 and the motor 330. The engine clutch 325 may connect or intercept power between the engine and the motor depending on switching of the HEV mode and the EV mode. Operation of the engine clutch 325 may be controlled by the controller 305.

The motor 330 may be operated by a three-phase AC voltage that is output from the MCU to generate a torque. The motor 330 may be operated as a generator during coasting of the vehicle or regenerative braking to supply a voltage (or regenerative energy) to the battery 340.

The battery 340 may include a plurality of unit cells. A high voltage may be stored in the battery 340 for providing a driving voltage (for example, 350-450 V DC) to the motor 330 that provides driving power to the wheels 190 or the HSG 320.

The transmission 350 may include a multiple speed transmission, such as an automatic transmission or a dual clutch transmission (DCT), or may include a continuously variable transmission (CVT). The transmission 350 may shift to a desired gear by using hydraulic pressure depending on control of the TCU to operate engagement elements and disengagement elements. The transmission 350 may transmit driving force of the engine 310 and/or the motor 330 to the wheels 390. Further, the transmission 350 may intercept power delivery between the motor 330 (or the engine 310) and the wheels 390.

Referring again to FIG. 1, in a determination step 110, the controller 305 may determine whether the cruise control (or the cruise travel) is set (or selected) by the driver of the hybrid vehicle after the waiting step 105.

A process, which is the method for controlling the SOC of the battery for cruise travel of the hybrid vehicle, proceeds to a decision step 120 when the cruise travel is selected by the driver. The process proceeds to the waiting step 105 when the cruise travel is not selected by the driver.

According to the determination step 120, when the cruise travel or driving speed is set, the controller 305 may predict (or determine) a SOC of the battery 340 including a SOC change slope of the battery 340 for the cruise travel based on a measured value (or an observed value) of the SOC according to a driving of the hybrid vehicle. In more detail, the controller 305 may predict (or determine) the SOC change slope of the battery 340 based on the measured value and a predicted value of the SOC of the battery 340 according to the cruise travel. The controller 305 may predict the change slope of the SOC using a regression analysis method.

In more detail, the regression analysis method, such as a simple regression analysis method (or a single regression analysis tool), may be used so that the SOC of the high voltage battery 340 is predicted.

The simple regression analysis method may be given by the following equation.

$$y_i = \beta_0 + \beta_1 x_i + \varepsilon_i (i=1 \ldots n)$$

In the equation, the variable $x_i$ may be a time when the hybrid vehicle 300 performs or operates under the cruise travel (or the hybrid vehicle travels at a constant speed). The sum $\beta_0 + \beta_1 x_i$ may be the predicted value of the SOC. The variable $\varepsilon_i$ may be an error. The variable $\beta_0$ may be determined by $$\beta_0 = \frac{\left(\sum_{i=0}^{n} x_t y_t\right) - n\overline{x}\overline{y}}{\left(\sum_{i=0}^{n} xt^2\right) - n\overline{xt}^2}.$$

The variable $\beta_1$ may be determined by $\beta_1 = \overline{y} - \beta_0 \overline{x}$. The variable $\beta_1$ may be calculated by an operation using the predicted value and the measured value. The variable $\overline{y}$ may be an average value of the predicted value. the variable $\overline{x}$ may be an average value of the time.

A trend of the SOC may be predicted by the SOC change slope that is the variable $\beta_1$. $R^2$ is a coefficient of determination and is a measure used in statistical analysis that assesses how well a model explains and predicts future outcomes. $R^2$ may be defined as $$1 - \frac{SSE}{TSS}.$$

In the coefficient of determination, $$SSE = \sum_{i=0}^{n} (y_i - \hat{y}_i)^2 \text{ and } TSS = \sum_{i=0}^{n} (y_i - \overline{y}_i)^2.$$

The variable SSE may be a sum of squares error and the variable TSS may be a total sum of squares. The variable $\hat{y}_i$ may be the measured value of the SOC. A value of the coefficient of determination $R^2$ may indicate reliability of the predicted value of the SOC of the battery 340.

According to a comparison step 125, the controller 305 may determine whether the change slope of the SOC is greater than zero. In other words, the controller 305 may determine whether the SOC of the battery 340 is increased.

According to a comparison step 130, the controller 305 may determine whether the predicted SOC of the battery is equal to or greater than a maximum value of a normal range of the battery 340 when the change slope of the SOC is greater than 0. The normal range (or a normal band) of the battery may be a region in which an optimum control of the engine operating point is possible and may be a normal region (e.g., the SOC is equal to or greater than 50% and is equal to or less than 80%) required for the cruise travel of the hybrid vehicle. The cruise travel of the hybrid vehicle 300 may be performed in the range, efficiency of the engine (or efficiency of the engine and the motor) may be maximized in the range, and balancing control of the SOC may be performed in the range.

According to a driving step 135, the controller 305 may drive (or operate) only the driving motor 330 that uses electric power of the battery 340 when the predicted SOC of the battery 340 reaches the maximum value of the normal range of the battery. In other words, the controller 305 may control the speed of the motor 330 to lower the SOC of the battery 340 when the predicted value ($\beta_0 + \beta_1 x_i$) of the SOC except the error reaches the maximum value.

According to a comparison step 140, when the change slope of the SOC is not greater than 0, the controller 305 may determine whether the change slope of the SOC is less than zero. In other words, the controller 305 may determine whether the SOC of the battery 340 is decreased.

According to a comparison step 145, when the change slope of the SOC is less than 0, the controller 305 may determine whether the predicted SOC of the battery is equal to or less than a minimum value of the normal range of the battery 340.

According to a driving step 150, when the predicted SOC of the battery 340 reaches the minimum value of the normal range of the battery, the controller 305 may drive (or operate) only the engine that charges the battery 340 using the HSG 320. In other words, when the predicted value ($\beta_0+\beta_1 x_i$) of the SOC, accounting for any statistical error, reaches the minimum value, the controller 305 may control the speed of the engine 310, which raises the SOC of the battery 340.

In more detail, before the SOC of the battery 340 reaches a maximum value that is greater than the maximum value of the normal range of the battery 340 as shown in FIG. 2, the controller 305 may control the hybrid vehicle 300 to perform the cruise travel by driving only the motor 330 based on the predicted SOC of the battery. Before the SOC of the battery 340 reaches a minimum value that is less than the minimum value of the normal range of the battery 340 as shown in FIG. 2, the controller 305 may control the hybrid vehicle 300 to perform the cruise travel by driving only the engine 310 based on the predicted SOC of the battery. Therefore, cruise travel performance of the hybrid vehicle 300 may be secured by balancing (or maintenance) of the SOC.

According to a maintenance step 155, when the change slope of the SOC is 0, the controller 305 may maintain a driving state of the hybrid vehicle 300 in a previous cruise travel state in which the driving motor 330 and the engine 310 are operated. In other words, the controller 305 may control the hybrid vehicle 300 to perform the cruise travel in the hybrid electric vehicle (HEV) mode.

The components, "~ unit", block, or module which are used in the present embodiment may be implemented in software such as a task, a class, a subroutine, a process, an object, an execution thread, or a program which is performed in a predetermined region in the memory, or may be implemented in hardware such as a field programmable gate array (FPGA) or an application-specific integrated circuit (ASIC), and may be performed with or implemented using a combination of the software and the hardware. The components, '~ part', or the like may be embedded in a computer-readable storage medium, and some part thereof may be dispersedly distributed in a plurality of computers.

As set forth above, embodiments have been disclosed in the accompanying drawings and the specification. Herein, specific terms have been used, but such terms are used only for the purpose of describing the present disclosure and are not used for qualifying the meaning or limiting the scope of the present disclosure. Therefore, it will be understood by those skilled in the art that various modifications and equivalent embodiments are possible from the present disclosure. Accordingly, the scope of protection for the present disclosure must be determined by the spirit and scope of the appended claims.

What is claimed is:

1. A method for controlling a state of charge (SOC) of a battery for cruise travel of a hybrid vehicle, the method comprising the steps of:
    predicting, by a controller, the SOC of the battery including a change slope of the SOC of the battery for a cruise travel based on a measured value of the SOC;
    determining, by the controller, whether the predicted SOC of the battery is equal to or greater than a maximum value of a normal range of the battery when the change slope of the SOC is greater than zero;
    driving, by the controller, only a driving motor of the hybrid vehicle, the driving motor using electric power of the battery when the predicted SOC of the battery reaches the maximum value of the normal range of the battery;
    determining, by the controller, whether the change slope of the SOC is less than zero when the change slope of the SOC is not greater than zero;
    determining, by the controller, whether the predicted SOC of the battery is equal to or less than a minimum value of the normal range of the battery when the change slope of the SOC is less than zero;
    driving, by the controller, only the engine of the hybrid vehicle, the engine charging the battery when the predicted SOC of the battery reaches the minimum value of the normal range of the battery; and
    maintaining, by the controller, a driving state of the hybrid vehicle in a previous cruise travel state in which the driving motor and the engine are operated when the change slope of the SOC is zero,
    wherein the normal range of the battery is a region required for the cruise travel of the hybrid vehicle.

2. The method of claim 1, wherein the controller predicts the change slope of the SOC using a regression analysis method.

3. The method of claim 2, wherein the controller calculates the change slope of the SOC based on the measured value according to the cruise travel and a predicted value of the SOC of the battery according to the cruise travel.

4. A device for controlling a state of charge (SOC) of a battery for cruise travel of a hybrid vehicle, the device comprising:
    a battery configured to store a high voltage; and
    a controller configured to predict the SOC of the battery including a change slope of the SOC of the battery for a cruise travel based on a measured value of the SOC,
    wherein the controller determines whether the predicted SOC of the battery is equal to or greater than a maximum value of a normal range of the battery when the change slope of the SOC is greater than zero, and wherein the controller drives only a driving motor of the hybrid vehicle, the driving motor using electric power of the battery when the predicted SOC of the battery reaches the maximum value of the normal range of the battery,
    wherein the normal range of the battery is a region required for the cruise travel of the hybrid vehicle,
    wherein the controller determines whether the change slope of the SOC is less than zero when the change slope of the SOC is not greater than zero, wherein the controller determines whether the predicted SOC of the battery is equal to or less than a minimum value of the normal range of the battery when the change slope of the SOC is less than zero, and wherein the controller drives only the engine of the hybrid vehicle, the engine charging the battery when the predicted SOC of the battery reaches the minimum value of the normal range of the battery, and
    wherein the controller maintains a driving state of the hybrid vehicle in a previous cruise travel state in which the driving motor and the engine are operated when the change slope of the SOC is zero.

5. The device of claim 4, wherein the controller predicts the change slope of the SOC using a regression analysis method.

6. The device of claim 5, wherein the controller calculates the change slope of the SOC based on the measured value according to the cruise travel and a predicted value of the SOC of the battery according to the cruise travel.

* * * * *